United States Patent [19]
Rich

[11] Patent Number: 5,674,048
[45] Date of Patent: Oct. 7, 1997

[54] STACK HANDLING SYSTEM

[75] Inventor: Donald S. Rich, Long Valley, N.J.

[73] Assignee: Technology Handlers, Inc., Long Valley, N.J.

[21] Appl. No.: 275,541

[22] Filed: Jul. 15, 1994

Related U.S. Application Data

[63] Continuation-in-part of Ser. No. 8,127, Jan. 22, 1993, abandoned.

[51] Int. Cl.⁶ ............................................. B65G 59/06
[52] U.S. Cl. .................................... 414/797.5; 414/795.7
[58] Field of Search ...................... 414/795.4, 795.7, 414/797.4, 797.5, 798, 798.1, 786

[56]    References Cited

U.S. PATENT DOCUMENTS

| | | | |
|---|---|---|---|
| 2,769,570 | 11/1956 | Adams | 414/797.5 |
| 2,858,043 | 10/1958 | Fenton et al. | 414/798 |
| 2,940,327 | 6/1960 | Gartner | 414/798 |
| 3,757,971 | 9/1973 | Frish | 414/797.5 |
| 3,858,732 | 1/1975 | Kemper | 414/797.5 |
| 4,043,460 | 8/1977 | Steele | 414/797.5 |
| 4,702,660 | 10/1987 | Niehaus et al. | 414/797.5 |

FOREIGN PATENT DOCUMENTS

| | | | |
|---|---|---|---|
| 1280749 | 10/1968 | Germany | 414/797.5 |
| 2839412 | 3/1980 | Germany | 414/797.5 |
| 144239 | 7/1985 | Japan | 414/797.5 |
| 209435 | 10/1985 | Japan | 414/797.5 |

Primary Examiner—Karen B. Merritt
Assistant Examiner—Gregory A. Morse
Attorney, Agent, or Firm—Rohm & Monsanto

[57]    ABSTRACT

An arrangement for handling stacks of articles, each article having a predetermined height dimension, employs a stack guide for maintaining the stack of articles in stacked alignment, and an elevator for rasing and lowering the stack guide. A retractable support is coupled to the stack guide for supporting the articles and selectably releasing a lowermost one of the articles, or in the alternative, picking up an article, such that the article is added onto the bottom of the stack. The retractable supports extend along the length of the articles and are rotatable between engaged and disengaged positions. A linear actuator is coupled to the retractable supports by operation of links and effects the rotation between the engaged and disengaged positions. A limiter assembly determines the lowermost limit of the elevator, and also defines a predetermined extent of upward travel, which predetermined extent corresponds to the height of an article of the stack. The lowermost limit of the elevator, as well as the upward extent of travel so as to correspond to the height of the articles, is predeterminable using a stop gauge and an increment gauge.

17 Claims, 4 Drawing Sheets

STACK HANDLING SYSTEM

RELATIONSHIP TO OTHER APPLICATION

This application for United States Letters Patent is a continuation-in-part of U.S. patent application Ser. No. 08/008,127, which was filed on Jan. 22, 1993, now abandoned, the disclosure of which is incorporated herein by reference.

BACKGROUND OF THE INVENTION

1. Field of the Invention

This invention relates generally to systems for handling stacks of articles, and more particularly, to an arrangement and method of presenting articles having predetetermined dimensions from a stack of such articles, and restacking same.

2. Description of the Related Art

There are numerous applications in which it is desired to release an article from a stack and after the article is subjected to a process, restacking same. One such application is in the field of integrated circuit test and inspection systems wherein integrated circuit chips are provided to certain manufacturers of electrode equipment in trays that hold a plurality of such chips. In practice, the trays typically may each hold some 50 to over 100 integrated circuit chips, in respective wells therein. The trays each have a predetermined height dimension, and are configured to be stackable.

It is vitally important that the trays, particularly with the integrated circuit chips therein, be handled gently. Known transport arrangements subject to trays to various mechanical shocks during handling. Such mechanical shocks disturb the placement of the integrated circuit chips in their respective wells in the trays, resulting in higher rejection rates following inspection. The integrated circuit chips are very delicate and typically contain electrical leads that are extremely close to one another, usury on the order of a few thousandths of an inch apart. There is therefore the ever present possibility that a mechanical shock will bend the delicate leads of the chips, either laterally into one another, or out of their common plane, that would create difficulty particularly with surface mounted devices.

It is, therefore, an object of this invention to provide a system for stacking and unstacking articles wherein the articles are reliably transported without being subjected to mechanical shock that would cause the articles or their contents to be displaced or damaged.

It is another object of this invention to provide a stacking and unstacking arrangement wherein the stacked articles are unstacked onto a conveyor arrangement, and during which unstacking the motion of the articles is always controlled.

It is also an object of this invention to provide a stack handling arrangement wherein the stacked articles are not dropped onto a conveyor.

It is a further object of this invention to provide a stack handling arrangement that easily can be reconfigured for articles having different height dimensions.

SUMMARY OF THE INVENTION

The foregoing and other objects are achieved by this invention which provides in a first apparatus aspect thereof, a stack handling arrangement for a stack of articles, each article having predetermined length, width, and height dimensions. In accordance with the invention, a stack guide maintains the stack of the articles in stacked alignment. An elevator raises or lowers the stack guide. There are additionally provided first and second retractable supports coupled to the stack guide for supporting the stack of the articles. The retractable supports are also coupled to the elevator for being raised and lowered with the stack guide and the stack of the articles. The first and second retractable supports are arranged to extend along a first direction that is substantially parallel to the length of the articles. Each of the first and second retractable supports is rotatable about a respective axis of motion that is parallel to the first direction. Rotation is effected between an engaged rotational position wherein the first and second retractable supports are in communication with a lowermost one of the articles of the stack and a disengaged rotational position. A first support actuator is arranged to be actuatable along a second direction, which is substantially orthogonal to the first direction. The first support actuator is coupled to the first and second retractable supports so as to cause them to rotate between the engaged and disengaged rotational positions. During such rotation, the retractable supports rotate counter to one another. In addition to the foregoing, there is provided a limiter for providing a lowermost limit of travel of the stack guide, and additionally for the further purpose of defining a predetermined extend of upward travel of the stack guide from its lowermost position.

In an advantageous embodiment of the invention, there is additionally provided a second support actuator arranged to be actuatable along a path parallel to the second direction for causing the first and second retractable supports to rotate between the engaged and disengaged rotational positions. In a preferred embodiment, the first and second support actuators are coupled to respective ends of the first and second retractable supports, distal from one another. The first support actuator is, in certain embodiments of the invention, a linear actuator, such as a pneumatic piston, having first and second ends, whereby actuation of the actuator causes an increase or decrease in the length between the first and second ends. In a practical embodiment of the invention, the linear actuator is a pneumatic cylinder whereby the length between its first and second ends is varied in response to the application of air pressure. There are additionally provided first and second links for coupling the first and second ends of the pneumatic cylinder to the first and second retractable supports. A resilient biasing element, such as a spring, is employed to apply a biasing force to each retractable support in the direction of the engaged rotational position. Thus, the biasing element serves as a fail-safe device, whereby in the event of power failure, the stack of the articles is not released and dropped.

As stated, the stack handling arrangement of the present invention includes a limiter. In a specific, illustrative embodiment of the invention, the limiter includes a spindle that is movable between raised and lowered positions. A stop is provided for defining a maximum raised position of the spindle. There is additionally provided a down-stop gauge installed on the spindle, for defining the lowermost limit of travel of the stack guide, when the spindle is in the lowered position. An increment gauge, which also is installed on the spindle and which communicates with the stop, defines a predetermined extent of upward travel of the stack guide. In practice, the predetermined extent of upward travel corresponds to the height of an article in the stack. Thus, once the stack has been placed on the lowermost position, the retractable supports are disengaged, and the stack guide is raised by an amount that corresponds to the height of the deposited article. The retractable supports are then reengaged with the article immediately above the deposited article, thereby enabling the remainder of the stack to be raised.

In a preferred embodiment, the spindle has a substantially cylindrical configuration. The down-stop gauge has a substantially annular configuration and is arranged to overlap concentrically at least a portion of the spindle. Similarly, the increment gauge has a substantially annular configuration and also is arranged to overlap concentrically at least a portion of the spindle means. In a preferred embodiment, the increment gauge has a larger internal diameter than the external diameter of the down-stop gauge, and therefore, can be accommodated thereover.

The elevator of the present invention can be in the form of a pneumatic drive. In other embodiments, however, the elevator constitutes a linear motor drive, and in such a case, the limiter corresponds to information states in a computerized control unit.

In accordance with an elevator aspect of the invention, an elevator arrangement is provided for raising and lowering a stack of articles, each article having predetermined length, width, and height dimensions. In accordance with the invention, a carrier is provided for supporting the stack of the articles in stacked alignment. An actuator raises or lowers the carrier, and a limiter defines a predetermined extent of upward travel of the carrier. The upward extent of travel corresponds, in a specific embodiment of the invention, to the height dimension of the articles.

In one embodiment of this further aspect of the invention, the limiter is provided with a spindle having raised and lowered positions. A stop defines a maximum raised position of the spindle, and an increment gauge, which is installed on the spindle, communicates with the stop as the spindle is raised, thereby defining the predetermined extent of upward travel of the carrier.

In another embodiment of this further apparatus aspect of the invention, the carrier includes first and second retractable supports for supporting the stack of the articles. The first and second retractable supports are arranged to extend along a first direction that is substantially parallel to the length of the articles. Additionally, each of the retractable supports rotates about a respective axis of rotation that is parallel to the first direction, such rotation being between an engaged rotational position wherein the first and second retractable supports are in communication with a lowermost one of the articles in the stack of articles, and a disengaged rotational position. A retractable support actuator is arranged to be actuatable along a second direction that is substantially orthogonal to the first direction. The retractable support actuator is coupled to the first and second retractable supports for causing them to be rotated between the engaged and disengaged positions. As previously indicated, the retractable support actuator is a pneumatic cylinder having first and second ends wherein the pneumatic cylinder is actuatable between first and second positions corresponding to first and second lengths between the first and second ends thereof. The first and second ends are connected by first and second links to the first and second retractable supports, respectively.

In accordance with a method aspect of the invention, there are provided the steps of:

lowering the stack of the articles to a predetermined level where a lowermost one of the articles is desired to be destacked;

disengaging a plurality of support members from communicating with the lowermost one of the articles is desired to be destacked;

incrementally raising the plurality of support fingers by a predetermined amount corresponding to the predetermined height dimension of the articles;

engaging the plurality of support members to communicate with a higher one of the articles in the stack of the articles; and raising the remainder of the stack of the articles whereby the lowermost one of the articles is destacked.

In one embodiment of this method aspect of the invention, the steps of lowering the stack and raising the remainder of the stack each include the step of actuating a first elevator unit. The step of incrementally raising includes the step of actuating a second elevator unit. Additionally, the steps of disengaging and engaging each include the step of counter-rotating the support members.

BRIEF DESCRIPTION OF THE DRAWING

Comprehension of the invention is facilitated by reading the following detailed description, in conjunction with the annexed drawing, in which.

DETAILED DESCRIPTION

Figure 1:
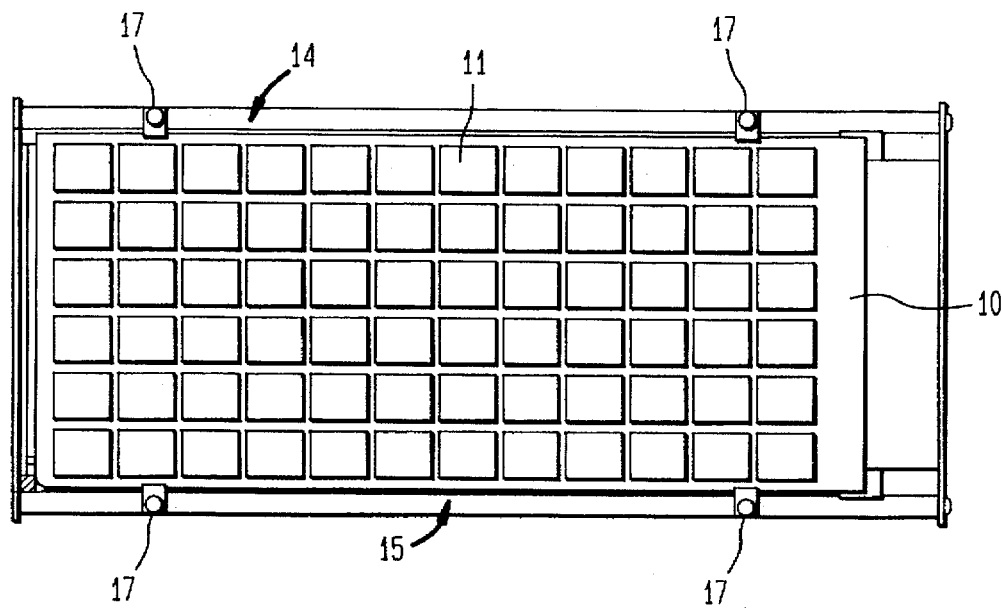
FIG. 1 is a top plan view of an embodiment of the invention showing a stack of trays with wells therein for accommodating integrated circuit chips.

FIG. 1 is a top plan view of a specific illustrative embodiment of the invention which illustrates that the stack of articles that is being handled is comprised of a plurality of trays 10. As shown in FIG. 1, each of trays 10 is provided with a plurality of wells 11. Each of the particular trays that are shown to be stacked is provided with an array of 6×12 wells 11 therein.

The stack of trays 10 is supported by retractable support elements 14 and 15 that, in this embodiment of the invention, extend along the length of the trays, on either side thereof. Each of the retractable support elements is provided with a plurality of finger elements 17, which will be described hereinbelow in greater detail with respect to FIGS. 4 and 5.

Figure 2:
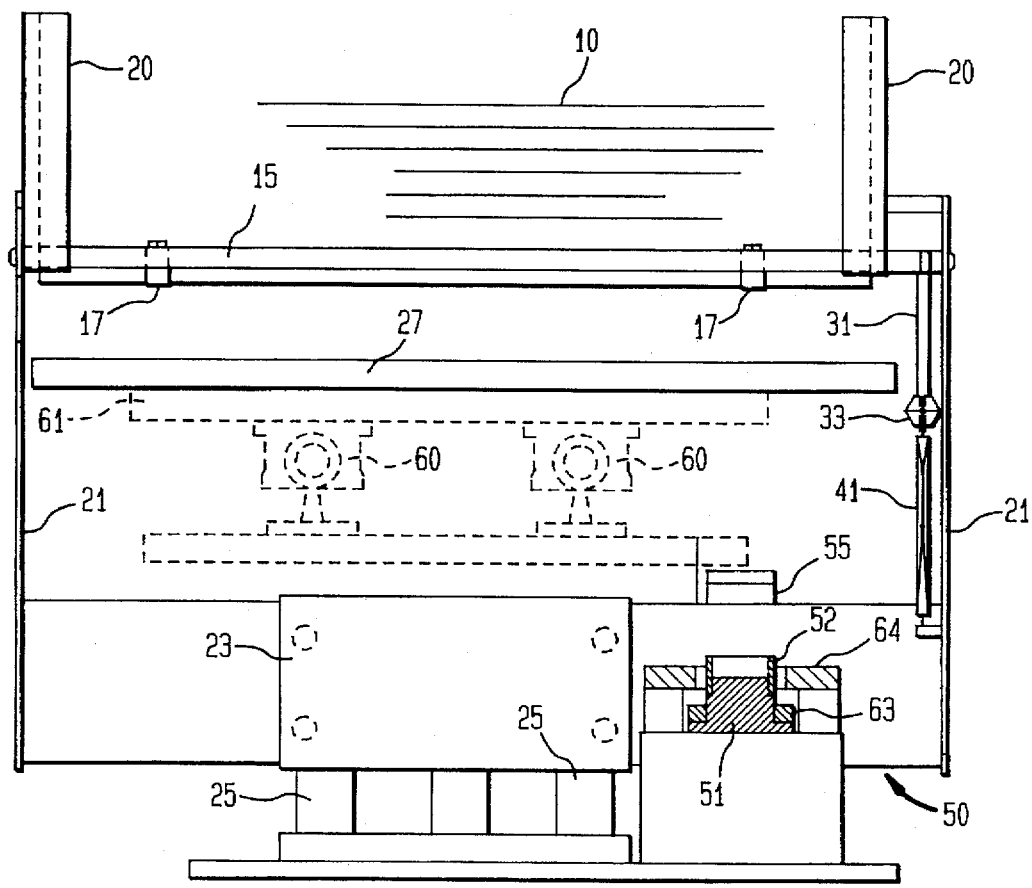
FIG. 2 is a side plan view, partially in phantom and partially in cross-section, of the embodiment of FIG. 1.

Referring to FIG. 2, this figure shows a partially fragmented and partially cross-sectional representation of the article stack handling system shown in FIG. 1. Accordingly, elements of structure that bear analogous correspondence with those described with respect to FIG. 1 are similarly designated. This figure shows a stack of trays 10 that is maintained in stacked alignment by operation of stack guides 20. The stack guides are coupled to respective ones of carrier panels 21 that are coupled to an elevator actuation unit 23.

In a practical embodiment of the invention, elevator actuation unit 23 is formed of a pneumatic cylinder (not shown in this figure) that is additionally provided with guide rods 25 for preventing the elevator from being laterally displaced during operation. When variations in air pressure are applied to elevator actuation unit 23, carrier panels 21, stack guides 20, retractable support elements 14, and trays 10 are selectably raised or lowered.

In FIG. 2, elevator actuation unit 23 is shown to be raised, and accordingly, retractable support elements 14 and 15 are shown to be raised above a deposited, lowermost tray 27. The remainder of the stack of trays 10 is supported by finger elements 17 installed on retractable support elements 14 and 15.

Figure 3:
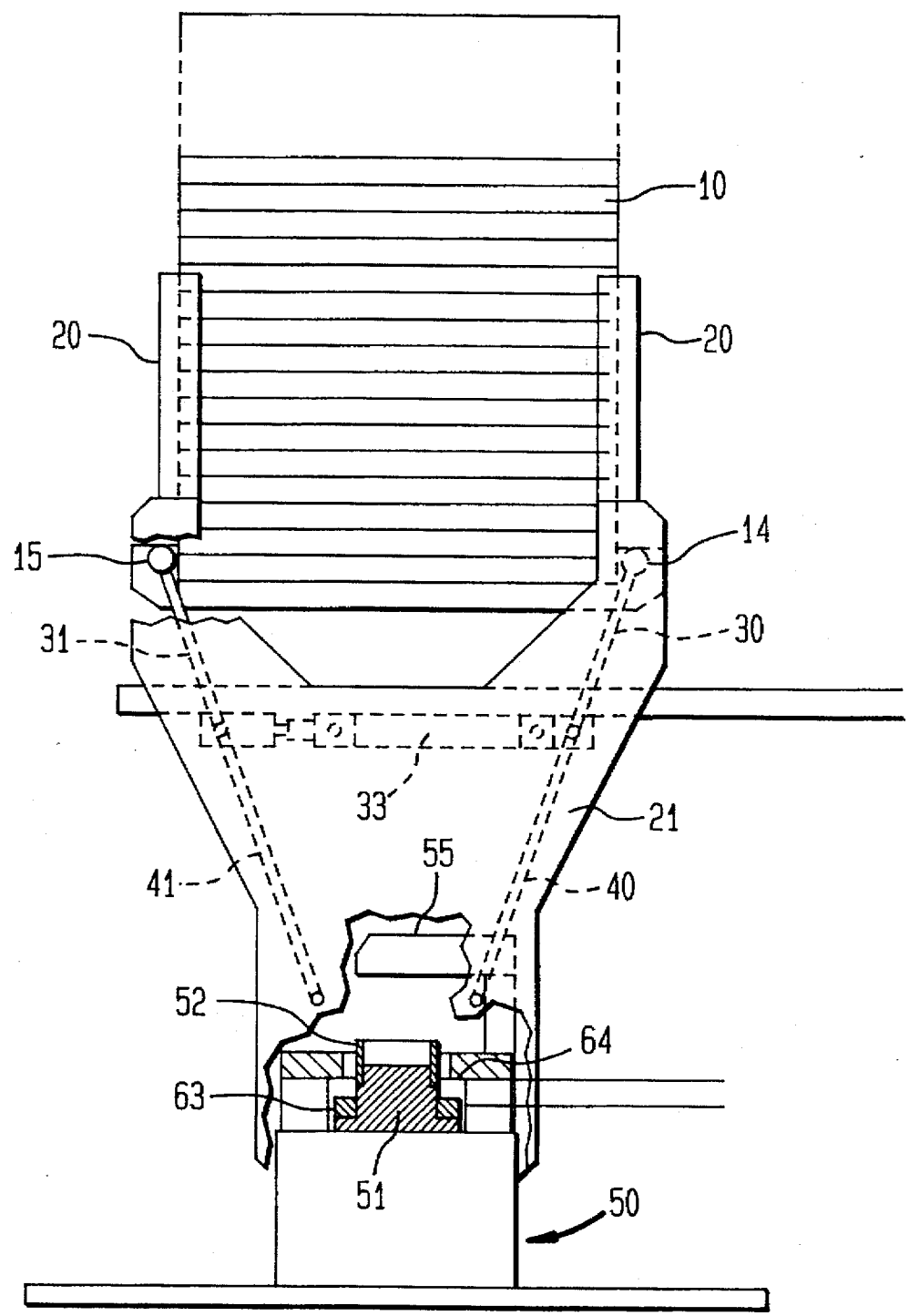
FIG. 3 is an end plan view of a pair of stack handling arrangements constructed in accordance with the principles of the invention, partially in phantom and partially in cross-section.
Figure 4:
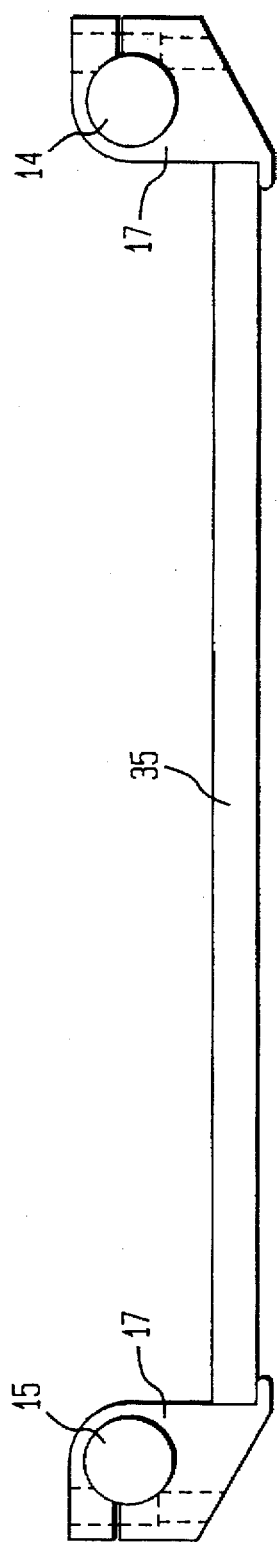
FIG. 4 is a schematic representation showing the retractable support elements engaged with a tray.

FIG. 3 is a partially fragmented and partially cross-sectional end view of the embodiment of FIG. 2. Retractable support elements 14 and 15, which have a circular cross-sectional configuration in this end view, are coupled to respectively associated links 30 and 31 that are each engaged to a respective end of a linear actuator 33. In this specific illustrative embodiment, the linear actuator is a pneumatic cylinder. When the pneumatic cylinder is actuated such that it is shortened in overall length, the retractable support elements, specifically finger elements 17, engage with the lowermost one of the trays, as shown in FIG. 4. FIG. 4 further shows a tray 35 being supported by finger elements 17.

Figure 5:
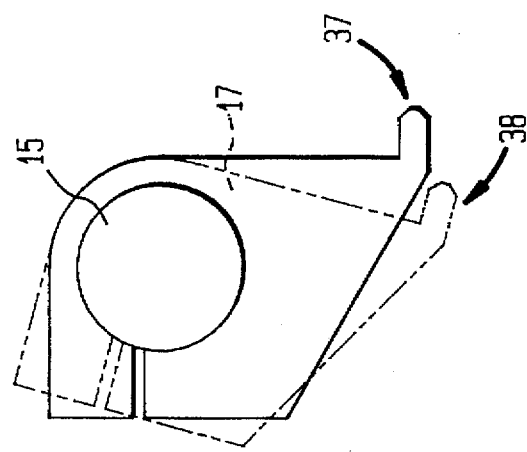
FIG. 5 is a schematic representation of the effect of rotating an illustrative retractable support element between engaged and disengaged rotational positions.

FIG. 5 is a schematic representation of finger elements 17 in an engaged rotational position 37 and a disengaged rotational position 38. The rotation of the finger element is responsive to the selective shortening and lengthening of linear actuator 33.

Referring once again to FIG. 3, the ends of linear actuator 33 couple not only to respective ones of links 30 and 31, but also to extension springs 40 and 41, respectively. The extension springs apply a biasing force that urges the retractable support elements into engaged rotational positions. In addition, the springs operate as a fail-safe mechanism whereby in the event of a power failure, the stack of trays 10 is supported, and not permitted to drop.

FIGS. 2 and 3 additionally show a limiter arrangement 50 that operates to define certain movements and stop locations of the stack handling unit. More specifically, limiter arrangement 50 is provided with a pneumatic cylinder having a spindle 51 that can be raised or lowered in response to the application of an air pressure in this embodiment. Spindle 51 is shown in a lowered position.

The spindle in this specific embodiment is substantially cylindrical, and is shown to be provided with a down-stop gauge 52 which, in this embodiment, is in the form of an annular member that is situated on the spindle. As shown, down-stop gauge 52 extends for a predetermined distance above spindle 51. Thus, when elevator actuation unit 23 is lowered, a dog 55 travels downward and is stopped at the top of down-stop gauge 52. The height of down-stop gauge 52 thus determines the lowermost level of the elevator actuation unit, and consequently, the lowermost level of the retractable support elements. Preferably, the height of down-stop gauge 52 is precisely defined to correspond with the placement of deposited lowermost tray 27 onto a tray transport arrangement 60 that is provided with a tray transport plate 61. The elevator actuation unit thereby deposits the lowermost tray 27 gently onto the tray transport plate. Once the lowermost tray is in communication with the tray transport plate, the retractable support elements are rotated by operation of linear actuator 33 so that finger elements 17 disengage from the deposited lowermost tray. Spindle 51 is then raised by the application of an air pressure in this embodiment, raising dog 55 and correspondingly raising carrier panel 21, stack guides 20, and the retractable support elements, and their associated finger elements. Spindle 51, however, will be raised only until an increment gauge 63, which also travels with the spindle, communicates with a stop plate 64. Thus, the height of increment gauge 63 determines the maximum amount of upward travel of spindle 51, and the corresponding elevation of the retractable support elements, with respect to the lowermost position. Preferably, the permissible stroke of limiter arrangement 50 corresponds precisely to the height of deposited lowermost tray 27, and therefore, finger elements 17 are raised to be precisely aligned with the edge of the next tray. At this point, linear actuator 33 is shortened, and the thus engaged retractable support elements will be enabled to lift the remainder of the stack of trays upon actuation of elevator actuation unit 23.

Down-stop gauge 52 and increment gauge 63 are easily removed and replaced with corresponding gauges having different heights, so as to accommodate trays or other articles of different heights.

Figure 6:
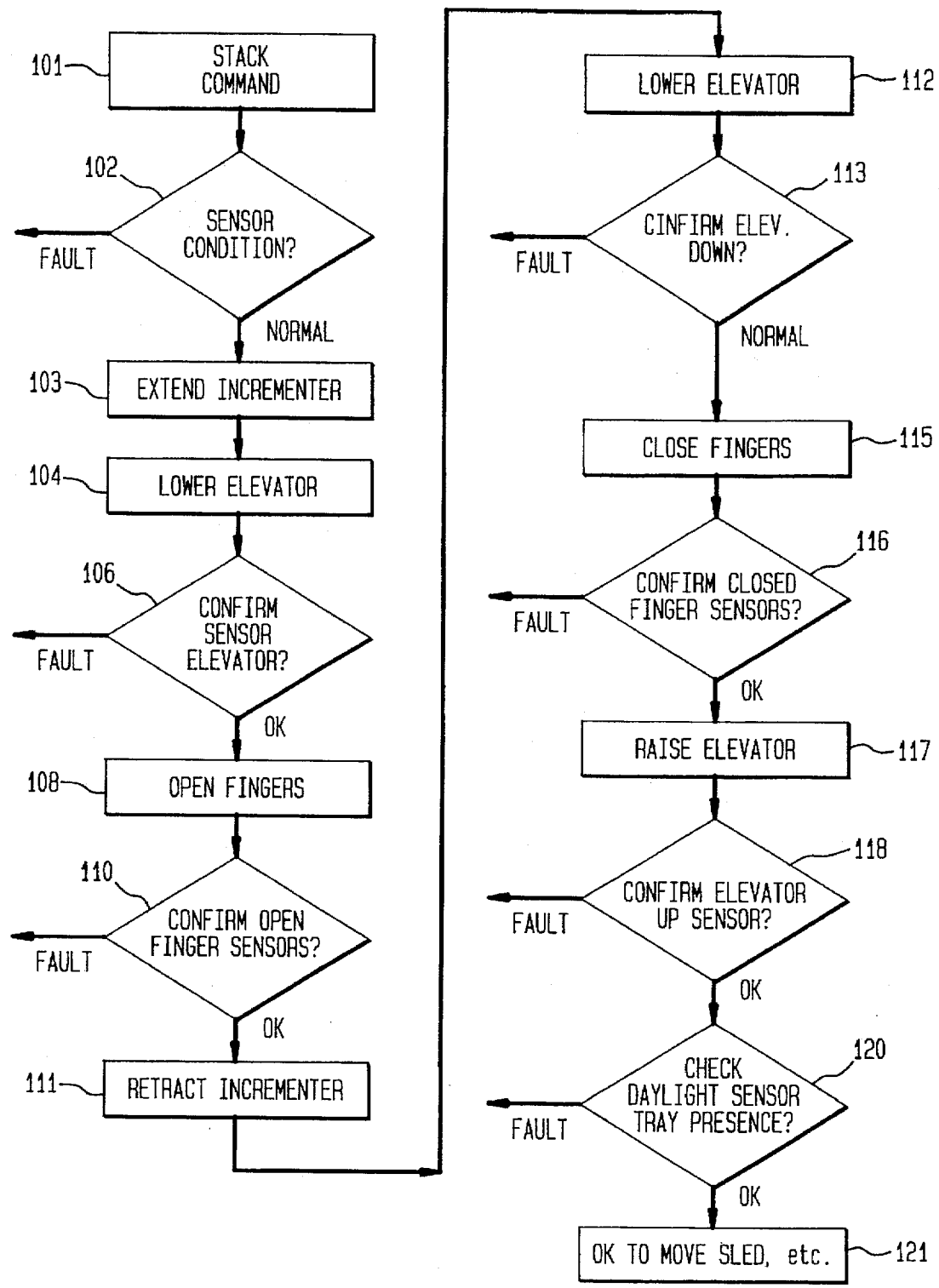
FIG. 6 is a functional logic-flow diagram illustrating the operation of the stack handling arrangement of the present invention.

FIG. 6 is a simplified block and line diagram that is useful to illustrate the operation of a specific illustrative embodiment of the invention. As shown, operating commands are issued from a stack command module 101. In this operating sequence, a tray is picked up, or stacked. First, stack command module 101 causes the sensors to be examined for a variety of operating conditions, including their respective states, at function block 102. If the sensors are deemed normal, the incrementer spindle is extended at function block 103, and the elevator is lowered at function block 104. The lowering of the elevator is confirmed at function block 106. If the lowered state of the elevator is confirmed by the sensor, the retractable support fingers are opened at function block 108, and such opening is confirmed at function block 110. After the open state of the support fingers is confirmed, the incrementer spindle is retracted at function block 111, and the elevator is lowered at function block 112. When it is confirmed that the elevator is in its downwardmost position, at function block 113, the support fingers are then closed at function block 115.

The closing of the support fingers is confirmed at function block 116, thereby insuring that the fingers are in position to support a lowermost tray, or other article, resting on the transport plate. The elevator is then raised at function block 117, and this is confirmed at function block 118. At this point, the tray or article on the transport plate will have been stacked at the bottom of the stack of articles, and there should not be a tray present on the tray plate. This is confirmed at function block 120 which then permits the sled, or tray plate, to be moved at function block 121.

At any time that a false condition is detected, such as at function blocks 102, 106, 110, 113, 116, 118, and 120, a fault condition is determined to exist, and operation of the system is discontinued. In some embodiments of the invention, the presence of a fault condition will cause an alarm (not shown) or other indicator to trigger, and corrective action is then taken by a human operator.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A stack handling arrangement for a stack of articles, each article having predetermined length, width, and height dimensions, the stack handling arrangement comprising:

stack guide means for maintaining the stack of the articles in stacked alignment;

elevator means for raising and lowering said stack guide means;

first and second retractable support means coupled to said stack guide means for supporting the stack of the articles, and coupled to said elevator means for being raised and lowered with said stack guide means and the stack of the articles, said first and second retractable support means being arranged to extend along a first direction substantially parallel to the length of the articles, and each of said first and second retractable support means being rotatable about a respective axis of rotation parallel to said first direction between an engaged rotational position wherein said first and second retractable support means are in communication with a lowermost one of articles in the stack of articles, and a disengaged rotational position;

support actuation means arranged to be actuatable along a second direction substantially orthogonal to said first direction independently of said elevator means, said first support actuation means being coupled to said first and second retractable support means for causing said first and second retractable support means to rotate between said engaged and disengaged rotational positions in directions of rotation counter to one another; and limiter means for defining a lowermost limit travel of said stack guide means and further defining a predetermined extent of upward travel of said stack guide means from said lowermost limit of travel of said stack guide means.

2. The stack handling arrangement of claim 1 wherein said first support actuation means comprises a linear actuator having first and second ends, said linear actuator being actuatable between first and second positions corresponding to first and second lengths between said first and second ends of said linear actuator, said linear actuator being coupled at said first and second ends thereof to said first and second retractable support means, respectively.

3. The stack handling arrangement of claim 2 wherein said linear actuator comprises a pneumatic cylinder having first and second ends, and which is actuatable between first and second positions corresponding to first and second lengths between said first and second ends thereof, and them are further provided first and second link means for coupling said first and second ends of said pneumatic cylinder to said first and second retractable support means, respectively.

4. The stack handling arrangement of claim 1 wherein them are further provided resilient biasing means coupled to said first and second retractable support means for applying a biasing force thereto in the direction of the engaged rotational position.

5. The stack handling arrangement of claim 1 wherein said limiter means comprises:

spindle means having raised and lowered positions;

stop means for defining a maximum raised position of said spindle means;

down-stop gauge means installed on said spindle means for defining said lowermost limit of travel of said stack guide means when said spindle means is in said lowered position;

increment gauge means installed on said spindle means for communicating with said stop means as said spindle means is raised and thereby defining said predetermined extent of upward travel of said stack guide means.

6. The stack handling arrangement of claim 5 wherein said spindle means has a substantially cylindrical configuration and said down-stop gauge means has a substantially annular configuration and is arranged to overlap concentrically at least a portion of said spindle means.

7. The stack handling arrangement of claim 6 wherein said increment gauge means has a substantially annular configuration and is arranged to overlap concentrically at least a portion of said spindle means.

8. The stack handling arrangement of claim 1 wherein said elevator means comprises a pneumatic drive.

9. The stack handling arrangement of claim 1 wherein said elevator means comprises a linear motor drive.

10. The stack handling arrangement of claim 9 wherein said limiter means correspond to information states in a computerized control unit.

11. An elevator arrangement for raising and lowering a stack of articles, each article having predetermined length, width, and height dimensions, the elevator arrangement comprising:

carrier means for supporting the stack of the articles in stacked alignment;

first actuator means for raising and lowering said carrier means;

second actuator means for raising said carrier means, said second actuator means having raised and lowered positions; and limiter means for defining a predetermined extent of upward travel of said carrier means in response to said second actuator means, said predetermined extent of upward travel corresponding to the height dimension of the articles.

12. The elevator arrangement of claim 11 wherein said limiter means comprises:

stop means for defining a maximum raised position of said spindle means; and increment gauge means installed on said spindle means for communicating with said stop means as said spindle means is raised and thereby defining said predetermined extent of upward travel of said carrier means.

13. The elevator arrangement of claim 11 wherein said carrier means comprises first and second retractable support means for supporting the stack of the articles, said first and second retractable support means being arranged to extend along a first direction substantially parallel to the length of the articles, and to rotate about a respective axis of rotation parallel to said first direction between an engaged rotational position wherein said first and second retractable support means are in communication with a lowermost one of articles in the stack of articles, and a disengaged rotational position.

14. The elevator arrangement of claim 13 wherein there is further provided retractable support actuation means arranged to be actuatable along a second direction substantially orthogonal to said first direction, said retractable support actuation means being coupled to said first and second retractable support means for causing said first and second retractable support means to rotate between said engaged and disengaged rotational positions.

15. The elevator arrangement of claim 4 wherein said retractable support actuation means comprises:

a pneumatic cylinder having first and second ends, and which is actuatable between first and second positions corresponding to first and second lengths between said first and second ends thereof, and first and second link means for coupling said first and second ends of said pneumatic cylinder to said first and second retractable support means, respectively.

16. A method of destacking a stack of articles, each having a predetermined height dimension, the method comprising the steps of:

actuating a first elevator unit to lower the stack of the articles to a predetermined level where a lowermost one of the articles is desired to be destacked;

actuating a plurality of support members independently of the first elevator unit to release the plurality of support members from communicating with the lowermost one of the articles which is to be destacked;

actuating a second elevator unit to raise incrementally the plurality of support fingers by a predetermined amount corresponding to the predetermined height dimension of the articles;

actuating the plurality of support members independently of the elevator to engage the plurality of support members to communicate with a higher one of the articles in said stack of the articles; and raising the remainder of the stack of the articles whereby the lowermost one of the articles is destacked.

17. The method of claim 16 wherein said steps of disengaging and engaging each comprise the step of counter-rotating the support members.

* * * * *